United States Patent [19]

Ballard

[11] 4,164,954  
[45] * Aug. 21, 1979

[54] FLUID PRESSURE CONTROL MECHANISM

[76] Inventor: Allan Ballard, 1552 Balena Ave., Ottawa, Ontario, Canada, K1G 0X3

[*] Notice: The portion of the term of this patent subsequent to Feb. 25, 1992, has been disclaimed.

[21] Appl. No.: 744,962

[22] Filed: Nov. 26, 1976

Related U.S. Application Data

[63] Continuation-in-part of Ser. No. 552,736, Feb. 25, 1975, abandoned, which is a continuation-in-part of Ser. No. 330,020, Jun. 2, 1973, Pat. No. 3,867,963.

[51] Int. Cl.² .............. G05D 16/00; F15D 1/02; F17D 1/20
[52] U.S. Cl. ................... 137/115; 137/510; 138/45; 138/46
[58] Field of Search .......... 137/115, 117, 505 R, 137/625.66, 461, 568, 510; 138/26, 30, 31, 37, 43, 44, 46, 45; 251/61.2, 75; 417/536

[56] References Cited

U.S. PATENT DOCUMENTS

| | | | |
|---|---|---|---|
| 2,290,337 | 7/1942 | Knauth | 138/30 |
| 2,662,348 | 12/1953 | Jacobsson | 137/505 R |
| 2,742,764 | 4/1956 | St. Clair | 137/505.12 X |
| 3,074,426 | 1/1963 | Billington | 137/505.12 X |
| 3,075,546 | 1/1963 | Roberts et al. | 137/505.12 X |
| 3,168,907 | 2/1965 | Mercier | 138/30 |
| 3,378,032 | 4/1968 | Harmand | 137/505.12 |
| 3,383,084 | 5/1968 | Mayfield | 251/75 |
| 3,487,855 | 1/1970 | Lautenberger | 138/31 |
| 3,557,945 | 2/1971 | Coiner | 251/61.2 |
| 3,731,707 | 5/1973 | Berle et al. | 137/625.66 |
| 3,867,963 | 2/1975 | Ballard | 138/46 |
| 3,892,258 | 7/1975 | Hendrick | 137/461 |

Primary Examiner—Stuart S. Levy

[57] ABSTRACT

A mechanism for smoothing out the flow from the output of a positive displacement pump consists of one or more flexible wall structures consisting of a Belleville spring and a cover plate held over the hole in the Belleville spring by a stepped washer secured to the cover plate set into one or more openings in a fluid container. Means is provided to hold the flexible wall structures in the openings with the convex side extending inwardly into the opening. An elastomeric diaphragm is disposed over the flexible wall structures in sealing relationship with the openings in the body of the fluid container. The flexible wall structures deflect outwardly responsive to fluid pressure within the container, and fluctuations in pressure within the container cause variations in the deflection of the flexible wall structures thereby providing a variable volume within the fluid container. To utilize deflection of the flexible wall structures to control pressure in the container adjustable control valve parts are mounted through the flexible wall structures and a lost motion mechanism which will permit the flexible walls to deflect outwardly to a working pressure position, but will, if deflected still further, open the control valve and permit fluid to return to the intake side of the pump. The control valve may be set up to function as a relief valve, or alternatively, as an unloader valve to permit pressure within the pulsation reducer to drop below normal working pressure. A further reduction in pressure will cause the control valve to close and pressure in the pulsation reducer will increase to working pressure.

9 Claims, 15 Drawing Figures

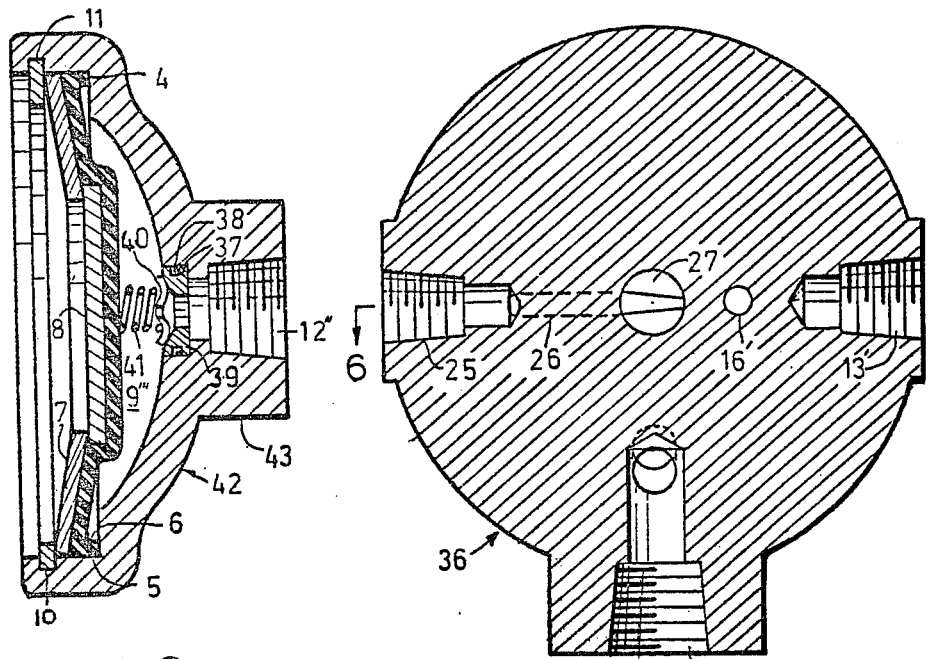
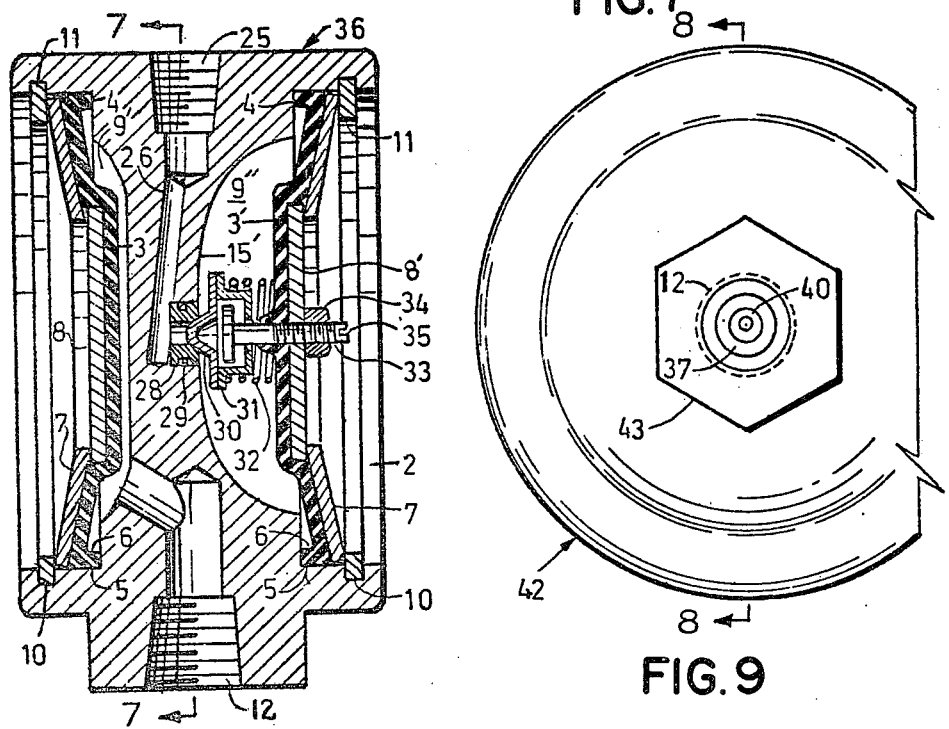

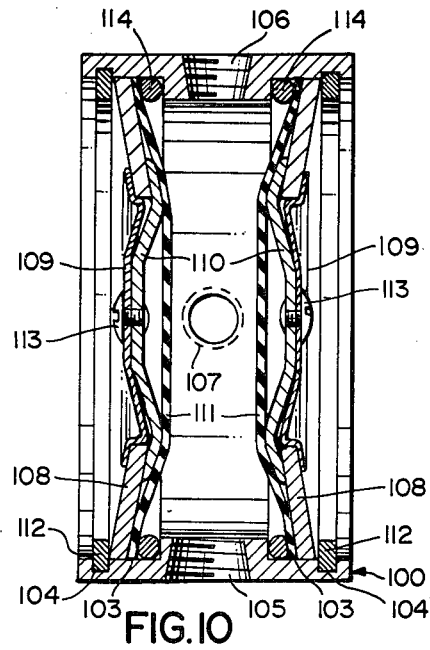
FIG.10
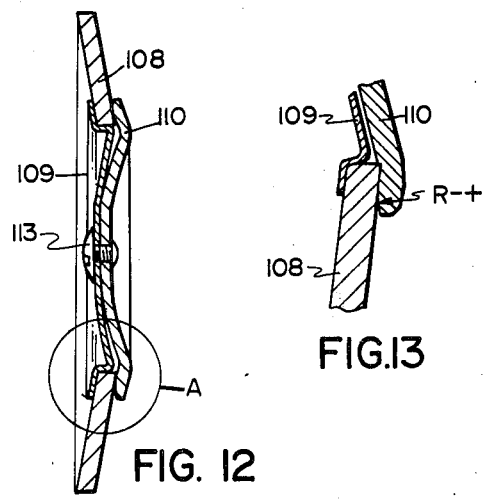
FIG. 12
FIG.13
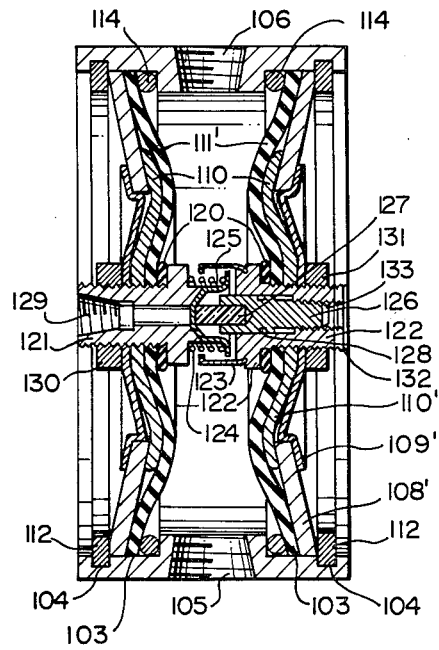
FIG.11
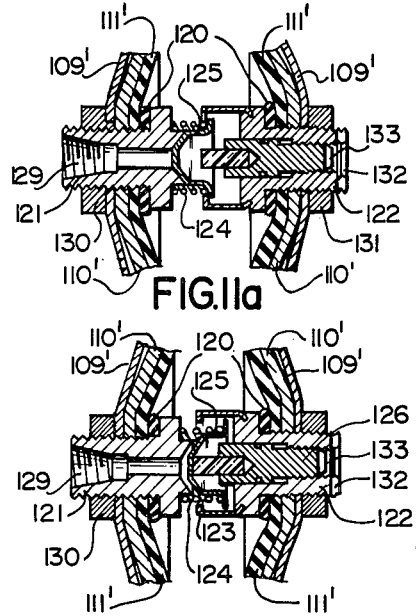
FIG.11a
FIG.11b

FLUID PRESSURE CONTROL MECHANISM

This application is a continuation of continuation-in-part U.S. application Ser. No. 552,736 filed Feb. 25, 1975 now abandoned which evolved from United States application Ser. No. 330,020 filed June 2, 1973 entitled "PULSATION REDUCER", now U.S. Pat. No. 3,867,963.

BACKGROUND OF INVENTION

This invention relates generally to pulsation reducers and more particularly to pulsation reducers for use in applications such as positive displacement fluid pumps and is intended to reduce impact loading on valves, fluid conduit pump bearings, pump drives, piston seals, on piston type pumps, and gear teeth and seals and housings of gear pumps etc.

Small high pressure positive displacement pumps particularly of the type that are often used in spray wash machines for example that disclosed in U.S. Pat. No. 3,238,890 Sadler et al issued Mar. 8, 1966 are often driven directly by an 1800 rpm electric motor, and utilize two opposed pistons, thus 3600 cycles per minute of pressure impulses and flow variations must be accomodated. If no pulsation reducer is used the whole pressure system is subject to impact loading (water hammer) at that frequency so that a pump delivering an average pressure of five hundred p.s.i. can, depending on the resiliency of the piping, hose etc., be subject to very great pressure variations a condition which is very damaging to pumps and flexible hose etc.

In U.S. Pat. No. 3,867,963, several embodiments of pulsation reducers utilizing a flexible wall structure consisting essentially of a Belleville spring-cover plate assembly having on its convex side a covering elastomeric diaphragm, sealingly held in a recess by its outer periphery so that on being subjected to fluid pressure the flexible wall structure will deflect outwardly to a mean position, and thereafter oscillate inwardly and outwardly responsive to pressure variations.

The original application also disclosed restrictors to inhibit outward flow of fluid from the pulsation reducer, and disclosed an over pressure control valve wherein deflection of a flexible wall structure byond a predetermined limit lifted a valve plunger from the seat of the control valve to permit return of over pressure fluid back to the intake side of the pump.

While I did state in original application "a pressure limitation valve . . . actuated by an adjustable lost motion linkage . . . may be incorporated into the body of my pulsation reducer, to permit return of over pressure fluid", I did not adequately illustrate how a pressure limitation valve could be arranged to function as an unloading valve, i.e. when pressure builds up in the system byond a predetermined working pressure a valve plunger is lifted from the seat of the pressure limitation valve, where it is normally held by internal pressure, and is moved away from the seat by a spring thereby permitting fluid to flow to the intake side of the pump through the unloading valve, and permit the pressure in the system to drop to a predetermined lesser pressure than the working pressure without re-engaging the valve plunger. When the pressure in the system is permitted to drop still lower, the flexible wall structures moves inwardly still further and force the valve plunger onto its seat to stop the flow of fluid to the intake side of the pump, so that internal pressure within the system will again rise to the working pressure.

By adjustably mounting the seat portion of the pressure limitation valve on one flexible wall structure, and the valve plunger actuating portion of the pressure limitation valve on the opposed flexible wall structure, the relative motion between the valve parts is doubled relative to using the movement of only one flexible wall for this purpose. This makes valve actuation less sensitive to small movements of the flexible wall structure and makes 'in operation' adjustments of upper and lower pressure limits possible. Furthermore, in the event of failure of either flexible wall structure because of, for example, the breaking of a Belleville spring, pressure in the system will immediately be reduced to a pressure less than the working pressure of the system.

PRIOR PRACTICE

To improve the life of such pumps and associated fluid conduit systems pulsation reducers or accumulators which use gas as a spring medium have been used, however, such pulsation reducers tend to be large and require frequent servicing, and/or require a source of high pressure gas for re-charging: they are also expensive, and difficult, or imposible to repair or recondition.

OBJECTS

To provide a pulsation reducer which provides a high degree of attenuation within a desired pressure range.

To provide pulsation reducer which utilizes the deflection characteristics of a Belleville spring having its centre hole covered by a plate, and supported against axial movement at its outer periphery and sealed to prevent leakage, to provide a variable volume to accomodate variations in the rate of flow of fluid under pressure.

To provide a pulsation reducer which achieves attenuation of liquid from a pulsating source by providing a fluid chamber connected thereto having flexible wall structures supported therein, the flexible walls including Belleville springs with cover plates secured thereto in covering relation over the hole in the springs to yieldingly provide support for sealing means to retain fluid within the chamber so that responsive to an increase in pressure within the pulsation reducer the flexible wall structures deflect outwardly to increase the volume contained within the fluid chamber, and vice-versa.

To provide a pulsation reducer whose working pressure can be changed by exahanging the spring elements.

To provide a pulsation reducer which can be serviced in situ.

To provide a pulsation reducer which has no sliding fluid seals or expanding or contracting gas filled or constrained bladders to effect pressure attenuation and therefor does not require gas either for charging or replenishing.

To provide a pulsation reducer which is inexpensive to manufacture is easily assembled and economical to service and maintain.

To provide a pulsation reducer including at least one flexible wall structure which is adapted to receive a part of a pressure control valve and cause the control valve part to oscillate toward and away from another part of the pressure control valve which may be connected to the fluid chamber, or preterably to an opposed flexible wall structure, the control valve including a seat, and a valve poppet respectively, a lost motion inkage or connection so that if the valve is a relief valve, deflection of the flexible walls beyond a predetermined amount will unseat the poppet from the valve seat and permit the over pressure fluid to escape through the valve seat back to the intake side of the pump. If the valve is an unloading valve, deflection of the flexible wall structure byond a predetermined amount will unseat the valve poppet, which is normally held closed by internal fluid pressure, a poppet spring will then move the poppet away from the valve seat to the extent permitted by the lost motion linkage, and fluid will pass through the valve seat, however, a restriction such as a throttling valve or orifice in the return fluid line retains sufficient pressure within the pulsation reducer to prevent sufficient return of the flexible wall structures to reengage the unloader valve poppet in the valve seat eg. the pressure may drop from 600 psi to 70 psi. If the pressure in the pulsation reducer is reduced still further, as for example by opening a spray gun nozzler, the flexible wall structures will move closer together and the poppet will be forced into engagement with the valve seat cutting off the return flow of fluids and pressure in the pulsation reducer will build up to a working pressure of the example 550 psi.

To provide a pulsation reducer having Belleville springs which utilizes movement of the resilient wall structure resulting from deflection of the Belleville springs to actuate a lost motion linkage which in turn operates pressure limiting valve which may be either a pressure relief valve, or an unloading valve.

To provide a combination pulsation reducer and control valve which can be adjusted to operate either as an over pressure relief valve, or as an unloader valve.

To provide a conbination pulsation reducer and control valve having two axially opposed flexible wall structures. One flexible wall structure having adjustably secured therein a valve seat with a by pass fluid passage extending through the flexible wall to the exterior of the pulsation reducer and the second flexible wall structure having adjustably secured therethrough a lost motion mechanism to control engagement and disengagement of a contained valve poppet with the valve seat on the opposed flexible wall structure, the relative limits of motion of the valve poppet with respect to the valve seat being adjustable from the exterior of the second flexible wall structure through the lost motion mechanism. With the control valve adjusted to operate in the unloading mode, the valve poppet is held against the valve seat by fluid pressure during working operation whereas during unloading, the valve popeet is held away from the valve seat by a poppet spring.

PRINCIPAL OF OPERATION

My invention uses one or more Belleville springs with a plate, secured in hole covering relation over the convex side of the Belleville spring by suitable fastening means including stepped washers, to provide flexible wall structures which support elastomeric disphragms that extend over the flexible wall structures and with either integral peripheral rings, or "O" rings engage inner body portions of my pulsation reducer in fluid sealing relation. The inner surface of the diaphragm acts as a fluid barrier to contain fluid within the body portion of my pulsation reducer. One or more flexible wall structures with covering diaphragms are provided in my pulsation reducer.

On being subjected to pressure the elastomeric diaphragm presses against the flexible wall structures, the outer periphery of which are supported by suitable means against axial movement, and deflect the flexible wall structures outwardly.

The Belleville spring size, thickness and free cone height are chosen to give a desired load deflection characteristic. For technical details of Belleville Spring design and characteristics reference is made to Transsactions of the American Society of Mechanical Engineers, May 1936, Volume 58 No. 4 for derivations of appropriate Belleville Spring Data in a paper by Almen and Laszlo.

If the ratio of the free height h, of the cone, to the thickness, t, of the Belleville spring is greater than about 0.4 i.e. h/5 0.4 the deflection vs. load characteristics will not be linear, and as h/t approaches 1.41 the load vs. deflection curve for a Belleville spring "flattens out" and again raises so that within a limited range of deflection within the "flattened out" range above referred to deflection can be varied with little if any change in applied load, deflection beyond the flattened out range requires increasing load.

If the Belleville spring is selected so that the working pressure within my pulsation reducer applies a load to the spring at the flattened out portion of the afore described curve, substantial variation in deflection of the Belleville spring or springs, and thus in the volume of the fluid contained within my pulsation reducer can be made with little change in pressure, and ideally with only enough pressure to overcome internal friction within the Belleville spring, the elastomeric diaphragm, and friction due to the miniscule radial movement of the Belleville spring as it contracts relative to the plate, and inertia of the masses of the assembly.

However, as a range of working pressures are required to accomodate slight differences in pump sizes and wear as well as variations in orifice size for example it is more practical to select Belleville springs having an h/t ratio less than 1.41 but greater than 0.6 so that within a working pressure nominally of 500 p.s.i. a cyclical variation of 5 to 10% in pressure is required to deflect the Belleville spring assembly back and forth to the extent necessary to attain the required attenuation.

The effect attained by selecting Belleville springs which are deflected to the extent and within the range proposed above is comparable to providing a large air chamber to attenuate a pump having a small displacement, or providing an accumulator charged with gas pressure to just under the mean working pressure of the pump.

DESCRIPTION OF PREFERRED EMBODIMENTS

In the drawings wherein like numerals refer to like parts wherever they occur;

FIG. 6 is a sectional view of an alternative form of pulsation reducer incorporating a pressure limiting valve within its body taken on line 2—2 of FIG. 1;

FIG. 7 is a sectional view taken on line 7—7 of FIG. 6 showing the location of inlet, outlet and return conduit connections for a pulsation reducer incorporating a pressure limiting valve;

FIG. 8 is a sectional view of a single stage pulsation reducer taken on line 8—8 of FIG. 9, and FIG. 9 is a fitting end view of a single stage pulsation reducer in accordance with this invention.

FIG. 10 is a sectional view of an alternative form double flexible wall pulsation reducer.

FIG. 11 is a sectional view of a double flexible wall pulsation reducer with a body like that of FIG. 10 illustrating a pressure control valve having parts adjustably secured to each of the flexible walls to provide a combined pulsation reducer and unloading valve.

FIG. 11a is a fragmentary sectional view showing the positional relationship between parts of the pressure control valve of FIG. 11 when the fluid system is subjected to a pressure just below the pressure at which the valve plunger would be lifted from the valve seat.

Figures 1, 2:
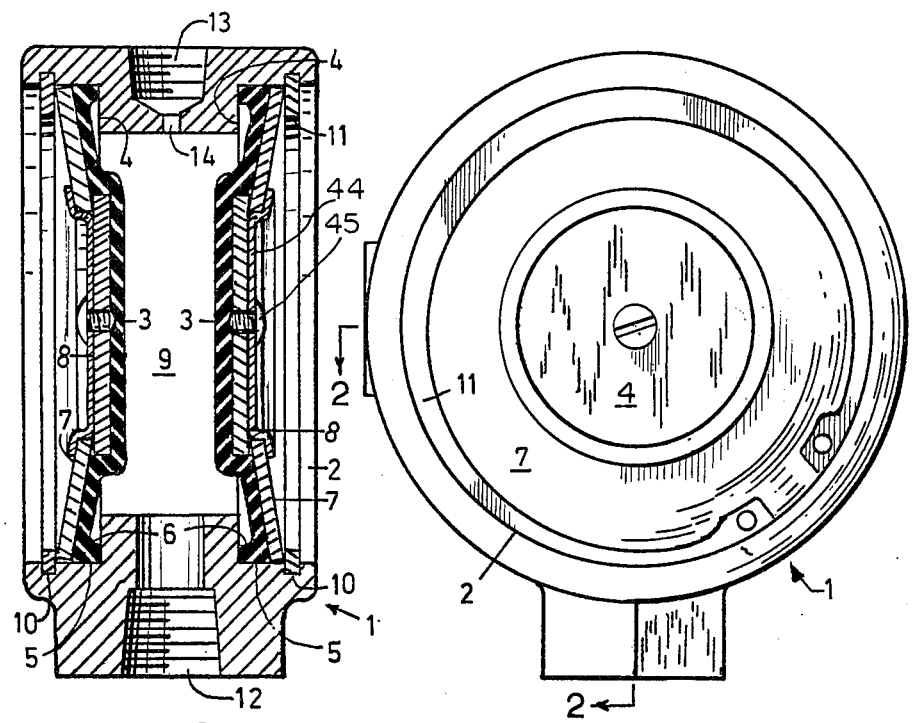
FIG. 1 is an end view of a double flexible wall pulsation reducer.
FIG. 2 is a sectional view of a pulsation reducer taken along the line 2—2 of FIG. 1 illustrating a single stage double flexible wall pulsation reducer.

FIG. 11B is a fragmentary sectional view showing the positional relationship between parts of the pressure control valve of FIG. 12 after the system has exceeded the pressure at which unloading is initiated, and wherein the flexiable wall structures have partially retracted permitting fluid at a pressure less than the working pressure of the system to flow through the pressure control valve to a return line (not shown)

FIG. 12 is a sectional view of a flexible wall structure as shown in FIG. 10.

FIG. 13 is an enlarged partial sectional view of the region A of FIG. 12.

In accordance with my invention a pulsation reducer 1 includes one or more openings 2 in a body 9 to receive a pre-formed elastomeric diaphragm 3 seated in abutting axial relation against a shoulder 4, and in sealing contact against a perimeter portion 5 of the openings 2. The inner surface of the diaphragm 3 provides a fluid barrier to retain fluid within the pulsation reducer 1, and internal pressure within the body 9 tends to increase the sealing effect of the peripheral portions 6 of the diaphragms 3 against the perimeter portions 5 of the openings 2. A Belleville spring 7 is seated in the opening 2 with the apex side of the Belleville cone directed inwardly, a generally circular cover plate 8 having means to retain it concentric with the Belleville spring 7 is disposed in engagement with the inner surface of the Belleville spring 7 so that the outer surface of the diaphragm 3 bears against the inner surface of the Belleville spring 7 and the cover plate 8. An annular spring 11 (TRUARK ®) is disposed in a grooves 10 in the openings 2 and bears against the outer peripheral edge of the Belleville spring 7 and holds the outer peripheral edge axially fixed when fluid pressure is exerted within the pulsation reducer 1.

On being subjected to internal fluid pressure the diaphragm 3 presses against the cover plate 8 and the Belleville spring 7 causing deflection of the Belleville spring 7.

The Belleville spring 7 will deflect outwardly to a means position and will oscillate in and out relative to the means position, in responsive to variations in the fluid pressure. While the elastomeric diaphragm 3 deflects to accomodate relative pivoting motion between the Belleville springs 7 and the openings 2, and also between the Belleville springs 7 and the cover plate 8.

Figure 5:
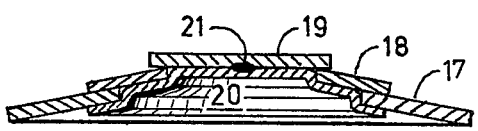
FIG. 5 is a section view of the flexible wall assembly taken along line 5—5 of FIG. 4.

The puslation reducer may be provided with one threaded inlet 12, and one or more outlets 13. If no oulets 13 are in the embodiments illustrated in FIGS. 2 and 3 single Belleville springs and cover plates are held in position by a pre-formed elastomeric diaphragm 3. FIGS. 4 and 5 illustrate an alternative form which uses two concentric nested Belleville springs 17 and 18 with a cover plate 19 all held in assembled relation by a stepped disc 20 secured as by a spot weld 21 between the cover plate 19 and the stepped can be arranged in analogous manner to achieve greater flexibility of design.

The principal reason for resorting to nested concentric arrangements of Belleville springs is to permit greater volume displacement for the same outer diameter with less maximum stress in the Belleville springs for a given pressure variation, and to reduce the loading stress between the Belleville springs 7 and the cover plate 8.

Many structural variations may be resorted to modify the function and use to which my pulsation reducer may be put, for example, a pressure limitation valve, either directly pressure actuated, or indirectly actuated by an adjustable lost motion linkage, which unseats a spring biased valve plunger responsive to movement of one or more Belleville springs, may be incorporated into the body of my pulsation reducer, to permit return of over pressure fluid through a suitable conduit to the intake of the pump. Or an unloading valve may be attached by suitable means such as a thread connection in the body of my pulsation reducer to permit return flow of fluid to the intake side of the pump.

The embodiment illustrated by way of example in FIG. 6 and generally designated 36 utilizes deflection of a Belleville spring 7 to unseat a plunger 30 seated in a valve seat 28 which may be suitably sealed as with an O Ring 29 in a mating socket 27 in the rigid divider 15'. Any suitable lost motion arrangement may be provided to permit a pre-determined deflection of the Belleville spring 7 to occur before the valve plunger 30 is lifted from the seat 28. A spring 32 bears against an elastomeric diaphragm 3' and against an apertured cap 31 which is fixed as by spot welding or soldering to the plunder 30. To effect unseating of the plunger 30 on over deflection of the Belleville spring 7. A headed adjustment bolt 33 having the head portion movably contained between the plunger 30 and the cap 31 extends through a suitable self sealing opening in the centre of the elastomeric diaphragm 3'. A threaded portion of the bolt 33 adjustably extends through a correspondingly threaded hole in the centre of cover plate 8'. The threaded end of the adjustment bolt is provided with a suitable adjustment slot 35, and a locking nut 34 provided on the outer end of adjustment bolt 33 is provided to secure the adjustment bolt in pre-determined adjustable position by jamming the locking nut 34 against the outside surface of the plate 8'. Thus upon exceeding a pre-determined pressure, valve plunger 30 is unseated by engagement between the head of bolt 33 and the inside of cap 31.

Internal pressure within chamber 9" together with force exerted by spring 32 are sufficient to effect sealing engagement between the plunger 30 and the seat 28 at pressures less than a pre-determined maximum pressure until plunger 30 is unseated.

For symmetry of forces and to provide space in the embodiment of FIG. 6 the over pressure relief valve is located on or near the axis of the Belleville springs 7 and therefore an interconnecting orifice 16' not shown in FIG. 6 has been shown in FIG. 7 to provide for fluid interconnection between fluid chambers 9' and 9" shown in FIG. 6. Thus at less than pre-determined pressure fluid enters the embodiment of FIGS. 6 and 7 through 12' passes through orifice 16' and exits through 13'. If pressure exceeds the pre-determined pressure sufficient fluid will pass through valve seat 28, return conduit 26 and return fitting 25 to prevent over deflection of the Belleville springs 7, and to allow fluid to be returned to the intake side of a pump as for example when the trigger of a spray wash gun is released.

A single Belleville spring pulsation reducer illustrated in FIGS. 8 and 9 resorted to for economy of construction or to conserve space. This embodiment generally designated 42 may be provided with flats or a hexagon for a wrench for ease of installation. If a relatively constant pressure is to be attenuated and a Belleville spring is selected to match the pressure closely i.e. a Belleville spring having an afore described flattened deflection curve within the range of deflection utilized, there should be as little resistance to inward and outward flow of fluid as possible, however, if a range of pressure is to be attenuated a Belleville spring having a greater range of working pressures may be used, and to improve damping of pulsations a flow restriction valve comprising a seat portion 37 suitably sealed as with an O ring 38 in a seat 39 in the body in communication between the inlet 12" and the pressure chamber 9" is provided with an appertured poppet 40 held into the seat 39 by a spring 41 bearing against the elastomeric diaphragm 3, so that there is very little resistance to passage of fluid into chamber 9", but considerable resistance to passage of fluid out of chamber 9" in reverse flow, thus damping of only that portion of the output of a reciprocating pump which enters the pulsation reducer is provided, and the rate at which fluid is returned by the pulsation reducer can be controlled by varying the area of the orifice in appertured poppet 40.

A suitable washer (not shown) may be provided on the outer side of the Belleville springs of my pulsation reducer either for decorative purposes, or to serve as a stop to prevent accidental over deflection of my Belleville springs.

Figures 3, 4:
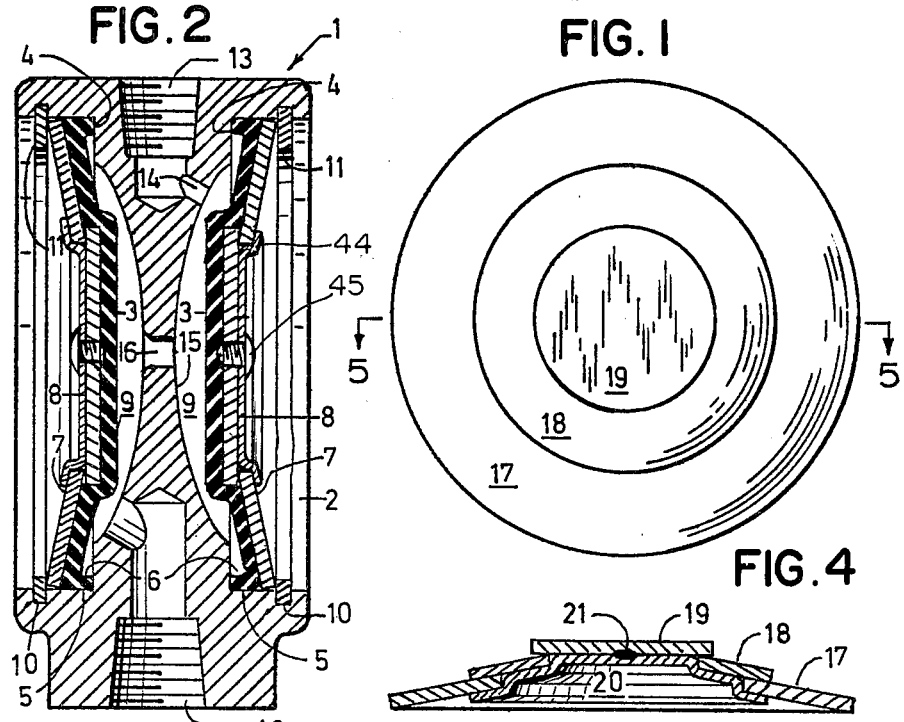
FIG. 3 is a sectional view of an alternative pulsation reducer provided with two compartments interconnected by a flow restricting orifice.
FIG. 4 is an end view of a flexible wall structure including concentric Belleville springs and plate assembly.

The embodiments illustrated in FIGS. 10 and 11 have bodies 102 which are generally similar to that of FIGS. 1 and 2 but are machined from a short piece of metal tube rather than being of cast construction as shown in FIGS. 1 and 2, and the positional relationship of threaded inlet 105 and outlet holes 106 and 107 are the same as 1" and 13' and 25 of FIG. 7.

Similar recesses 103 are machined into each end of the body 102 of sufficient depth to provide shoulders for sealing engagement with "O" rings 114, and to receive in turn, elastomeric diaphragms 111, and Belleville springs 108. Retaining ring grooves 104 are machined into the recesses 103 to receive TRUARC® spring rings 112 which support the O rings 114, the elastomeric diaphragms 111, and the outer peripheral portion of the Belleville spring part 108 of the flexible wall structures and prevent significant axial displacement and yet allow for relative pivoting between the Belleville springs and the body 102.

While internal pressure will assist in retaining fluid sealing engagement when the flexible wall structure is deflected outwardly it is desirable to compress the elastomeric diaphragms 111 and the O rings 114 by an amount at least equal to the distance that the Belleville springs 108 deflect outwardly in the region of the O rings 114.

The flexible wall structure illustrated in FIG. 12 consists of a Belleville spring 108 yieldingly damped between a double dished cover plate 110 and a stepped washer 109 by a screw 113. FIG. 13, an enlargement of portion A in FIG. 12 illustrates a preferred shape of the portion of the cover plate which engages the Belleville spring 108. A curved engagement surface having a radius R is provided on the cover plate 110 so that as the Belleville spring is deflected a combined rolling and sliding action will occur between the contacting surfaces. By this provision wear is spread over a larger surface area on both the cover plate 110 and the Belleville spring 108.

During assembly the space between the dished washer 109, the cover plate 110 and the Belleville spring is packed with a suitable lubricant such as molybdenum disulfide grease to further improve the effective life of the flexible wall structure.

To reduce the thickness and therefor the mass of the cover plate 110 and to provide the contact radius R, I prefer to press form the cover plate 10 in a coining die from high tensile sheet steel discs. Also to retain acceptable concentricity of the flexible wall structures, the dished washer 109 is also press formed with enough radial and axial clearance in the part which extends into the aperture of the Belleville spring 108 so that it will not bind therein when the Belleville spring is deflected. The dished washer 109 becomes in effect a spring to yieldably hold the flexible wall structure together and concentric at all deflections thereof.

In the embodiment shown in FIG. 10 the flexible wall structures are held together with a screw 113 which extends through the dished washer 109 in threaded engagement with cover plate 110. In the embodiment of FIG. 11 the flexible wall structures are also held together by threaded engagement and functions substantially identically as flexible walls. However, the flexible walls of FIG. 11 are each provided with parts of a pressure control valve.

The left hand flexible wall of FIG. 11 includes a female part 121 of a pressure control valve which is machined from hexagonal metal stock and extends from the interior of the pulsation reducer through an elastomeric washer 120, an elastomeric disphragm 111', in threaded engagement with a cover washer 110', a stepped washer 109' and a lock nut 130. The female part is provided with a through passage having at its outer end a female pipe 129 to receive a return line fitting (not shown). At its inner portion, the female part 121 is machined to provide an abutment shoulder for a spring 124, and the inner end of female part 121 is machined to provide a valve seat.

The right hand flexible wall of FIG. 11 includes a male part 122 of a pressure control valve which is also machined from hexagonal metal stock and extends from the enterior of the pulsation reducer through an elastomeric washer 120, an elastomeric diaphragm 111', in threaded engagement with a cover washer 110', a stepped washer 109', and a lock nut 131. An inwardly flanged sleeve 123 is secured as by crimping its other end to the inner end of the male part 122, and a cupped valve poppet 125, provided with an outwardly extending flange to provide an abutment for the spring 124 and extends radially byond the spring to also provide an abutment for engagement with the inwardly directed flange of the sleeve 123.

The male part 122 is provided with a stepped through bore, the outer portion being threaded, and the inner portion being cylindrical and smooth. An adjustment screw 126 slotted at 133 at its outer extremity and threaded for the outer part of its length and cylindrical for the inner part of its length and dimentioned to closely match the cylindrical and threaded portions of the bore of the male part 122 is provided with an O ring groove to accomodate O ring 128, and is also provided at its inner end with a socket to receive an elastomeric plug (or spring) 127, is adjustably screwed into the bore of male part 122. The elastomeric plug 127 is adapted to adjustably and releasably engage the inner end of the valve plunger 125. The valve plunger 125, the spring 124 and the flanged sleeve 123 constitute a lost motion mechanism.

When pressure in the pulsation reducer is less than the unloading pressure, the elastomeric plug 127 presses the valve plunger 125 against the valve seat of female part 121 preventing escape of any fluid through the female part 121. The elastomeric plug (or spring) 27 being much stiffer than the spring 124 can compress the spring 124 without being itself appreciably compressed.

As the pressure builds up in the pulsation reducer both flexible walls deflect outwardly. Internal fluid pressure experts a force on the valve plunger 125 great enough to overcome the force of the spring 124 which biases the valve plunger 125 toward the male part 122. As deflection proceeds the elastomeric plug 127 desengage the valve poppet 125 and internal fluid pressure continues to hold the valve poppet against the seat of female part 121 and the flexible walls are free to oscillate in and out without effecting the pressure control valve.

At a predetermined pressure above the working pressure of the system in which the pulsation reducer is used the inwardly directed flange of sleeve 23 will engage the outwardly directed flange of the valve poppet 125 (See FIG. 11a) and lift the valve plunger off the valve seat of female part 121 against the force exerted by internal fluid pressure. Whereupon the spring 124 will move the valve poppet away from the valve seat and into contact with the elastomeric plug 127.

With the valve seat uncovered pressure in the pulsation reducer will drop to a pressure less than the working pressure (See FIG. 11b) through escape of fluid through the female part 21. A suitable flow restriction in the return line (not shown) will retain sufficient pressure in the pulsation reducer to prevent complete return of the flexible wall structures and the spring 124 will hold the valve plunger away from the seat of female part 121, and a stable unloading pressure wall remain in the system. If pressure in the system is permitted to drop still further as for example by opening a spray gun valve, the flexible wall structures will retract further, and the elastomeric plug 127 will force the valve poppet 125 against the force of spring 124 into contact with the seat of female part 121, and pressure in the system will return to working pressure.

In the described mode the pressure control valve acts as an unloader valve. If however the elastomeric plug (or spring) 127 is made longer than illustrated, or if the adjusting screw 126 is screwed in far enough as that the plug or spring always remains in pressure contact with the valve plunger 125, the control valve will act as a pressure relief valve only.

Initial adjustment of the pressure control valve is achieved by screwing female part 121 and male part 122 into the threaded cover plates 110' against the yielding elastomeric washers 120 and flexible diaphragms 111' and securing the dished washers 109' in position with lock nuts 130 and 131 respectively, and inserting the flexible wall structures in the openings 103 and securing them in position with spring rings 112 as shown in FIG. 11. Upper pressure limits may be adjusted by using a screw driver engaged in slot 132 at the outer end of male part 122 to further compress (to reduce upper pressures and vis-versa) elastomeric washer 120 and unloading pressure may be varied using a screw driver in slot 133 of adjustment screw 126.

It should be noted that while for simplicity of illustration stepped washers such as 20, or 109 as are illustrated in FIGS. 5 and 10 respectively have not been shown in FIGS. 2, 3, 6 it is intended that such washers with means for securing such to cover plates 8 and 8' be used if required as for example if sheet form rather than pre-formed elastomeric diaphragms are used and stepped washers or the equivilent are required to retain the flexible wall structures concentric.

Cast iron, malleable cast iron, cast, formed, or forged steel suitably machined and coated to resist corrosion are preferred materials for the body of my pulsation reducer, and stainless steel or brass are preferred for springs, valves, parts and seats.

A plurality of my pulsation reducers may be placed in series or parallel relation to increase their attenuation capacity.

In place of an elastomeric diaphragm to effect a fluid tight seal O rings of suitable elastomeric material have been used seated in suitable O ring grooves in a stepped part of opening 2 (not shown) and in the outer peripheral region of the plate 8 (not shown) to bear directly against the Belleville springs 7. This arrangement has proven satisfactory, however, because of the need to use special materials to achieve protection from corrosion if O rings are used I prefer to use a single piece preformed elastomeric diaphragm to separate the Belleville springs 7, or 17 and 18, the spring clip 11 as well as the plates 8 and 19 respectively from the fluid in the pulsation reducer.

Highly corrosive liquids can be attenuated in my pulsation reducer if the body portion is formed of stainless steel or alternatively the interior of my pulsation reducer may be lined with inert material such as epoxy resin, or the same elastomeric material of which my diaphragm 3 are formed.

Many variations in form structure and use of my pulsation reducer will readily occur to those skilled in the art. Therefore, it will be understood that I intend to cover by the appended claims all such variations which fall within the true spirit and scope of my invention:

I claim:

1. A resilient wall structure for use in a pulsating fluid pressure control device comprising:
    at least one frusto-conical apertured Belleville spring,
    a plate means disposed in aperture covering load supporting relation against inner portions of the convex side of said Belleville spring,
    a resilient washer means in engagement with inner portions of the concave side of said Belleville spring, and connecting means interconnecting said plate means and said resilient washer means to resiliently hold said plate means and said resilient washer means together in generally concentric aperture covering relation against said Belleville spring to permit relative pivotal and radial movement between said plate means and said Belleville spring means on axial deflexion of said Belleville spring.

2. A resilient wall structure as claimed in claim 1 wherein said resilient washer means is provided with an aperture to receive said connecting means, and said plate means is provided with a threaded aperture to receive a matching threaded portion on said connecting means to yieldably secure said Belleville spring axially between said plate means and said resilient washer means.

3. A resilient wall structure as claimed in claim 2 wherein a portion of one or both of said plate means and said resilient washer means extend into the aperture in said Belleville spring to retain said plate means and said resilient washer means concentric with respect to said Belleville spring.

4. A resilient wall structure as claimed in claim 3 wherein said resilient washer means is stepped to provide at least one shoulder which extends into the aperture in said Belleville spring to hold said Belleville spring, said plate means, and said resilient washer means assembled in concentric alignment.

5. A resilient wall structure as claimed in claim 4 wherein said connecting means includes a fluid passage extending axially therethrough, and is provided on a first a valve poppet on the plate means end of said connecting means and a pressure fluid conduit coupling means.

6. A resilient wall structure as claimed in claim 4 wherein said connecting means has a passage extending axially therethrough, and is provided on a first end, disposed on a pressure control valve activating mechanism operative on predetermined deflection of said resilient wall structure to open or close the pressure control valve, said pressure control valve activating mechanism including,
a valve poppet having an outwardly extending flange,
a sleeve member secured to said connecting member at one end and extending over said poppet, and having an inwardly directed flange at the other end for releasable engagement with the outwardly extending flange of said valve poppet to permit predetermined relative axial displacement between said valve poppet and said connecting member, and
adjustment means disposed in fluid tight relation in said passage for predetermining the extent of relative axial displacement between said valve poppet and said connecting member.

7. A pulsating fluid pressure control device comprising:
a body having a fluid containing chamber with at least one opening for a connection to permit fluid to flow into and out of said fluid containing chamber,
said body having at least one recess and having disposed in each such recess in fluid sealing engagement,
an elastomeric diaphragm means supported by,
a resilient wall structure consisting of,
a frusto-conical apertured Belleville spring,
a plate means disposed in aperture covering load bearing relation against inner peripheral portions of an inwardly facing convex side of said Belleville spring,
a resilient washer means in engagement with inner peripheral portions of the concave side of said Belleville spring,
connecting means interconnecting said plate means and said resilient washer means to hold said plate means and said resilient washer means together in generally concentric aperture covering relation against said Belleville spring ring,
said resilient wall structure being secured in said recess by engagement between said spring ring and said elastomeric diaphragm, so that on being subjected to fluid pressure the elastomeric diaphragm will press against the resilient wall structure and deflect it until the reaction force of the Belleville spring balances the fluid pressure.

8. A pulsating fluid control device as set forth in claim 7 wherein said body has first and second axially aligned recesses.

9. A pulsating fluid pressure control device as set forth in claim 8 wherein;
the connecting means of the resilient wall structure disposed in said first and second recesses extend through and sealingly engage the inwardly disposed surfaces of their respective said elastomeric diaphragm means, and
the connecting means of the resilient wall structure disposed in said first recess includes a fluid passage extending axially therethrough, and ends at its inner end with a seat for a poppet of a pressure control valve, and said connecting means is provided at its outer end with a fluid conduit coupling means,
the connecting means of the resilient wall structure disposed in said second recess has an aperture extending axially therethrough, and includes on its inner end a pressure control valve and activating mechanism including
a valve poppet having an outwardly extending flange,
a sleeve member secured to said inner end of said connecting means in said recess, and extending over said poppet, and having an inwardly directed flange at its other end for releasable engagement with the outwardly extending flange of said valve poppet,
poppet adjustment means disposed in fluid tight relation in said aperture for adjusting the extent of possible axial displacement between said valve poppet and the inner end of the connecting means in said second recess, and
poppet spring means in said chamber extending between the connecting means in said first recess and said poppet, to urge said poppet away from said poppet seat so that at pressures less than unloading pressures said poppet adjustment means forces said poppet into its seat, and said poppet is kept seated by fluid pressure until working pressure is exceeded whereupon said sleeve means lifts said poppet off said seat, and said poppet spring holds said poppet off its seat and pressure is reduced to unloading pressure.

* * * * *